(12) United States Patent
Somerville et al.

(10) Patent No.: US 6,234,844 B1
(45) Date of Patent: May 22, 2001

(54) ELECTRONIC CARD CONNECTOR

(75) Inventors: James A. Somerville, Hershey; Paul G. Rutledge, Lancaster, both of PA (US); Kevin P. Kady, Highlands, NJ (US)

(73) Assignee: Berg Technology, Inc., Reno, NV (US)

( * ) Notice: Subject to any disclaimer, the term of this patent is extended or adjusted under 35 U.S.C. 154(b) by 0 days.

(21) Appl. No.: 09/605,756

(22) Filed: Jun. 28, 2000

(51) Int. Cl.[7] .................................................. H01R 24/00
(52) U.S. Cl. ......................... 439/630; 361/737; 439/946
(58) Field of Search ........................... 439/64, 630, 946; 361/737, 686, 792

(56) References Cited

U.S. PATENT DOCUMENTS

| | | |
|---|---|---|
| 4,931,622 | 6/1990 | Ohtsuki et al. ....................... 235/487 |
| 5,281,148 | 1/1994 | Thompson ............................... 439/59 |
| 5,660,568 | 8/1997 | Moshayedi ............................ 439/654 |
| 5,679,007 | 10/1997 | Potdevin et al. ..................... 439/76.1 |
| 5,752,857 | 5/1998 | Knights ................................. 439/638 |
| 5,780,827 | 7/1998 | Zolkos et al. ......................... 235/441 |
| 5,814,805 | 9/1998 | Reichardt et al. .................... 235/479 |
| 5,854,891 | 12/1998 | Postlewaite et al. ............. 395/188.1 |
| 5,906,516 | 5/1999 | Sato et al. ............................. 439/630 |
| 5,911,587 | 6/1999 | Vermeersch .......................... 439/188 |
| 5,993,261 | 11/1999 | Klatt et al. ............................ 439/630 |

Primary Examiner—Tulsidas Patel
(74) Attorney, Agent, or Firm—Perman & Green, LLP (57) ABSTRACT

Card reading apparatus capable of accepting different sized disconnectible electronic cards, including memory storage cards such as larger smart cards and smaller S.I.M. (signature identification module) cards, includes a reader housing assembly which encloses a connection chamber. A conventional connector in the connection chamber has a plurality of resilient contacts projecting toward a course to be taken by a memory storage card as it is inserted through an entry slot into the housing assembly. Each memory storage card is rectangular and includes a similarly sized and positioned plurality of contact pads thereon for mechanical and electrical engagement, respectively, with the plurality of resilient contacts on the connector in the connection chamber when inserted into the connection chamber through the entry slot and advanced to a seated position. Mutually engageable alignment mechanisms are provided both on the reader housing assembly and on each of the disconnectible memory storage cards to assure that each of the contact pads is in mechanical and electrical engagement, respectively, with the plurality of resilient contacts on the connector in the connection chamber when an associated disconnectible memory storage card is advanced to the seated position.

20 Claims, 5 Drawing Sheets

ELECTRONIC CARD CONNECTOR

BACKGROUND OF THE INVENTION

1. Field of the Invention

The present invention relates generally to electronic card reading apparatus for receiving a card in which integrated circuits are incorporated to have electronic functions and, more particularly, to such apparatus capable of accepting different sized electronic cards.

2. Description of Earlier Developments

With the development of the integrated chip technique in recent years, integrated circuits on a great scale in a small chip have come to be realized and a variety of electronic cards of credit card size and shape have been devised for a wide variety of applications. Thus, so-called "smart cards" have come to be well-known in the industry with embedded computer chips connected to metallic contact pads on a major surface. These smart cards are insertable into card readers which make electrical contact with the pads of the card through contacts mounted in the card reader housing. Some card readers are provided with end of position switches to detect that a card has been inserted and is located in a read position. U.S. Pat. No. 5,911,587 discloses a card reader offering such a possibility and further provides a hinged cover for minimizing the entry of dust and debris in the connection region.

A similar but separate line of innovation has resulted in a so-called "SIM-card" which is of a size much smaller than a smart card. SIM is an acronym for "subscriber identity module" and a SIM-card also has embedded computer chips connected to metallic contact pads on a major surface. In this instance, though, the SIM-card is insertable into an item of electronic equipment such as a telephone and provides vital information about its owner. This item of electronic equipment is provided with a SIM-card reader capable of reading the information provided on the embedded microchip. In some instances, for example, the information presented on the SIM-card is necessary to enable the item of electronic equipment to be used by the owner or other authorized persons. A patent disclosing a known construction of SIM-card reader is U.S. Pat. No. 5,814,805 to Reichardt et al. which includes a hinged receptacle or cover movable between an initial position and a card reading position.

It was with knowledge of the foregoing that the present invention has been conceived and is now reduced to practice.

SUMMARY OF THE INVENTION

Card reading apparatus capable of accepting different sized disconnectible memory storage cards such as larger smart cards and smaller S.I.M. (signature identification module) cards includes a reader housing assembly which encloses a connection chamber. A conventional connector in the connection chamber has a plurality of resilient contacts projecting toward a course to be taken by a memory storage card as it is inserted through an entry slot into the housing assembly. Each memory storage card is rectangular and includes a similarly sized and positioned plurality of contact pads thereon for mechanical and electrical engagement, respectively, with the plurality of resilient contacts on the connector in the connection chamber when inserted into the connection chamber through the entry slot and advanced to a seated position. Mutually engageable alignment mechanisms are provided both on the reader housing assembly and on each of the disconnectible memory storage cards to assure that each of the contact pads is in mechanical and electrical engagement, respectively, with the plurality of resilient contacts on the connector in the connection chamber when an associated disconnectible memory storage card is advanced to the seated position.

A primary feature, then, of the present invention is the provision of improved electronic card reading apparatus for receiving disconnectible memory storage cards in which integrated circuits are incorporated to have electronic functions.

Another feature of the present invention is the provision of such electronic card reading apparatus which is capable of accepting different sized disconnectible memory storage cards.

Still another feature of the present invention is the provision of such electronic card reading apparatus including a reader housing assembly enclosing a connection chamber including a connector therein with a plurality of resilient contacts projecting toward a course to be taken by a disconnectible memory storage card as it is inserted into the housing assembly, the housing assembly having an entry slot in communication with the connection chamber for reception therethrough of a disconnectible memory storage card being inserted into the connection chamber and first and second rectangular disconnectible memory storage cards, each including a similarly sized and positioned plurality of contact pads thereon for mechanical and electrical engagement, respectively, with the plurality of resilient contacts on the connector in the connection chamber when inserted into the connection chamber through the entry slot and advanced to a seated position, and mutually engageable alignment mechanisms both on the reader housing assembly and on each of the disconnectible memory storage cards to assure that each of the contact pads is in mechanical and electrical engagement, respectively, with the plurality of resilient contacts on the connector in the connection chamber when an associated disconnectible memory storage card is advanced to the seated position.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
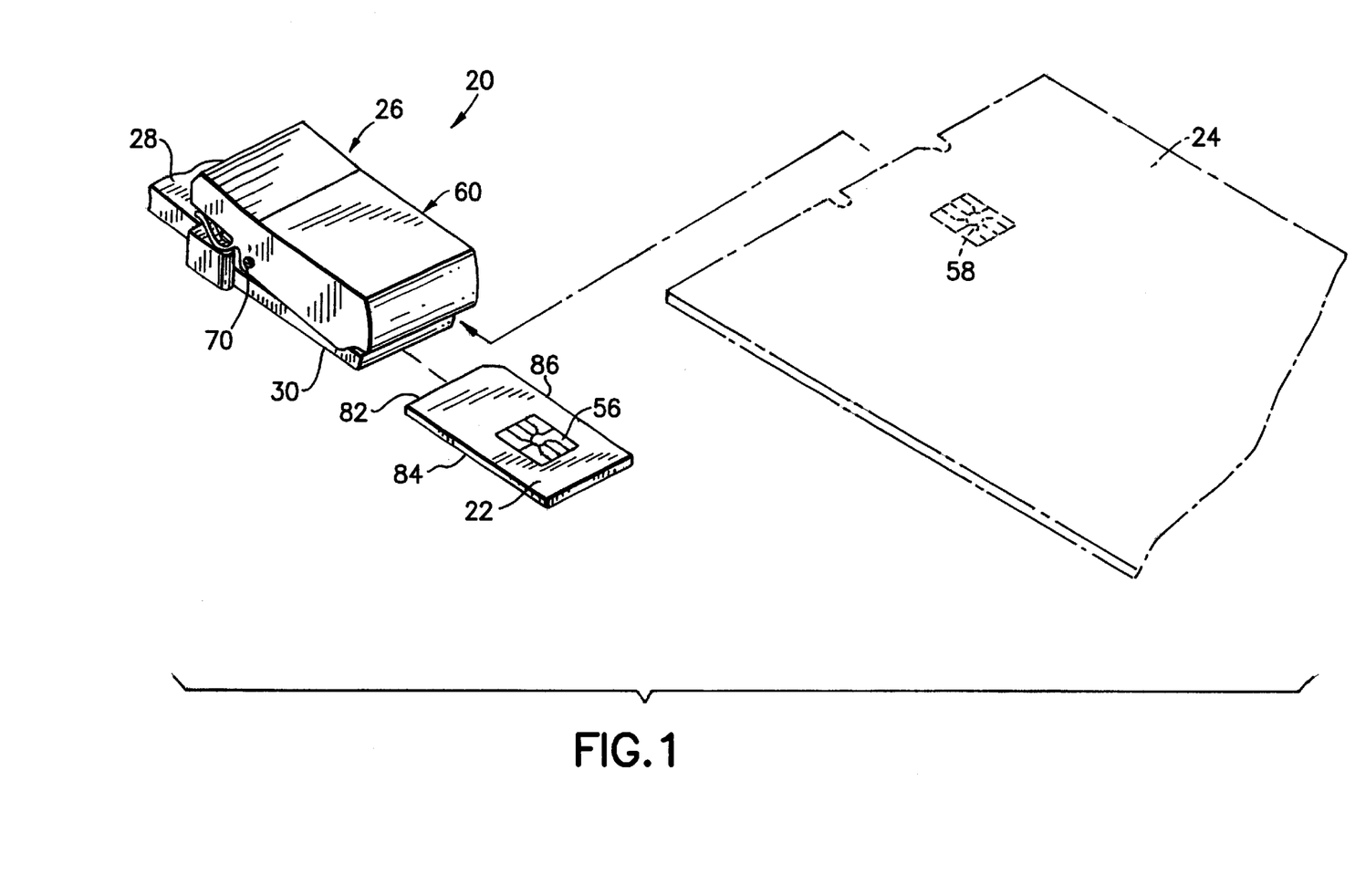
FIG. 1 is an exploded perspective view of a card reading system embodying the present invention.

Referring to FIG. 1, there is shown an exploded perspective view of a card reading system 20 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The card reading system 20 is capable of accepting different sized disconnectible electronic cards, such as memory storage cards 22, 24, respectively. The memory storage card 22 is illustrated as a SIM-card while the memory storage card 24 is illustrated as a smart card as they have been earlier described. Of course, it must be recognized that other styles of memory storage cards may be used so long as they incorporate the novel features of the present invention.

The system 20 includes a reader housing assembly 26 which is adapted to be electrically joined to an electrical connector, such as a style A-type USB plug connector 28. As seen in FIGS. 2–5, the reader housing assembly 26 includes a bottom tray member 30 which has a receiving surface 32 for one of the disconnectible memory storage card 22, 24. The receiving surface 32 extends between an entry slot 34 through which the memory storage cards 22, 24 are inserted into a connection chamber 36 and a stop surface 38 on a shoulder member 40 upstanding from the bottom tray member at a location distant from the entry slot. Laterally spaced apart tab members 42, 44 integral with the shoulder member 40 serve as locating indicia and project, respectively, toward the entry slot 34.

The reader housing assembly 26 also includes a printed circuit board 46 overlying the card receiving surface 32 and, together with the card receiving surface of the bottom tray, defines the connection chamber 36. A connector 48 is mounted, for example, to traces (not shown) on the printed circuit board and includes a plurality of resilient contacts 50 projecting from a housing and toward the card receiving surface 32 and, therefore, transversely of a course to be taken by a disconnectible memory storage card as it is inserted into the housing assembly. A fixed cover 52 protectively overlies, and is in contiguous relationship with, the printed circuit board 46 and sandwiches the printed circuit board between the fixed cover and the bottom tray member 30. Similarly, contacts in connector 28 can secure to traces on PCB 46.

Figure 5:
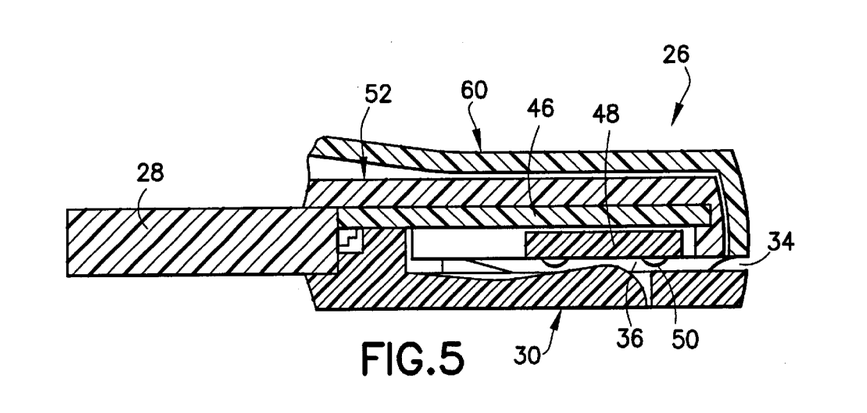
FIG. 5 is a cross section view, in side elevation, of the reader housing assembly.
Figure 6:
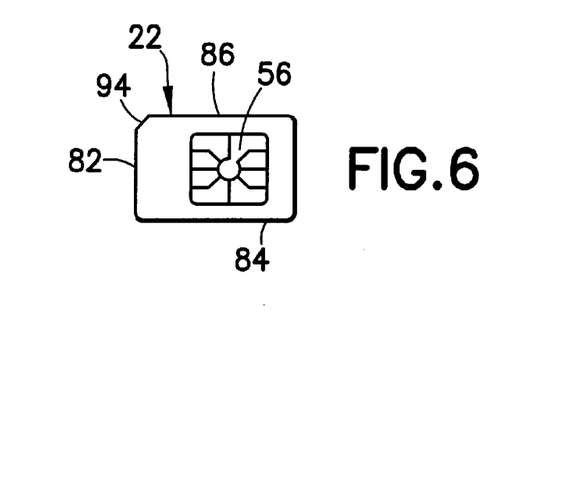
FIGS. 6 and 7 are top plan views of disconnectible memory storage cards with which the invention is used, respectively, a SIM-card and a smart card.
Figure 7:
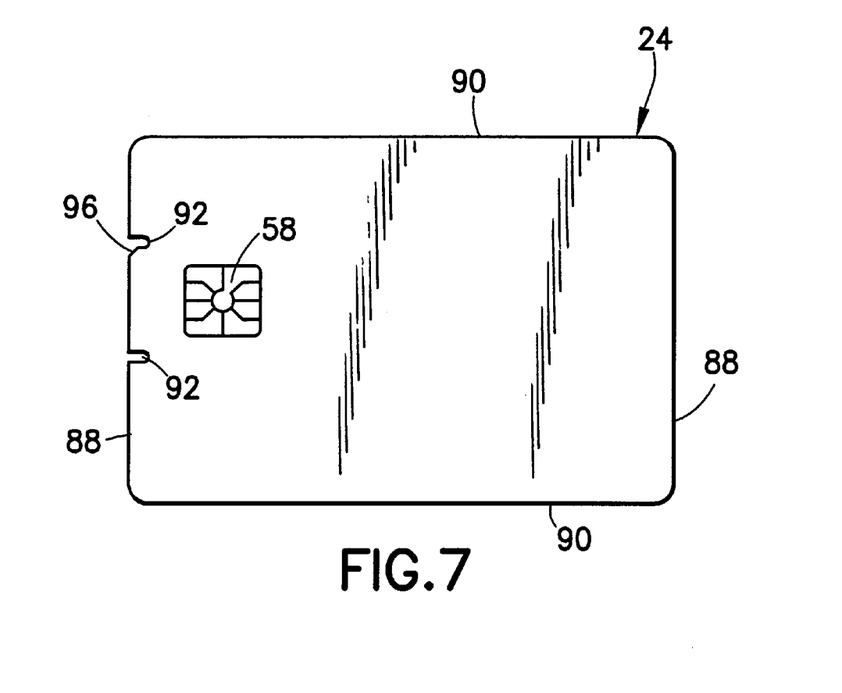

The card receiving surface 32 of the bottom tray member 30 includes a prominence 54 for urging contact pads 56, 58 of the disconnectible memory storage cards 22, 24, respectively, into engagement with the resilient contacts 50 of the connector 48 in the connection chamber 36 of the reader housing assembly 26 when a disconnectible memory storage card is in a seated position. Alternatively, a prominence 54 could be the distal end of a cantilevered arm (not shown) in bottom tray 30 to provide a resilient feature.

Figure 3:
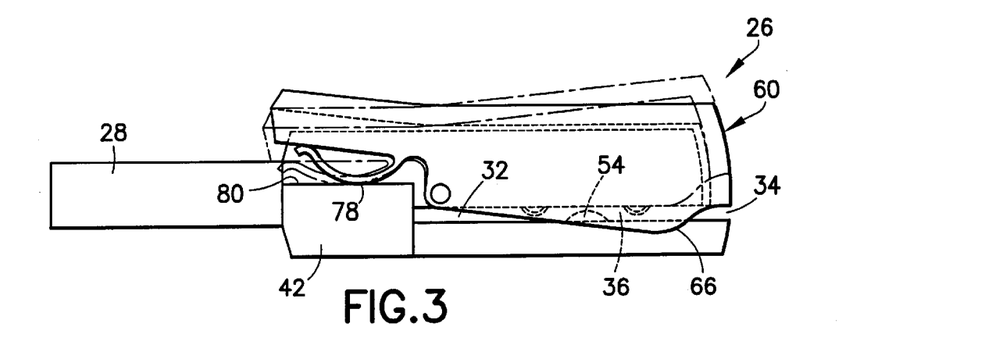
FIG. 3 is a side elevation view of the reader housing assembly illustrating two positions of its movable cover.
Figure 4:
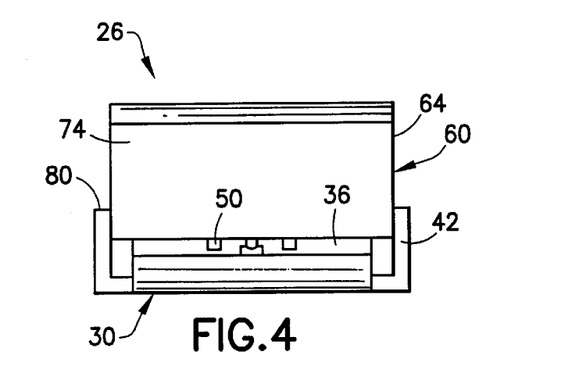
FIG. 4 is front elevation view of the reader housing assembly.

A movable cover 60 is pivotally mounted on and overlies the bottom tray member 30 and is movable between a first position indicated by solid lines in FIG. 3 for reception of either disconnectible memory storage card 22, 24 and a second position indicated by phantom lines in FIG. 3 upon reception of the second larger disconnectible memory storage card 24. The movable cover is biased toward the first position in a manner to be described.

The movable cover 60 includes a top member 62 and a pair of parallel, spaced apart, side skirt members 64 depending from the top member. When the reader housing assembly 26 is assembled, the card receiving surface 32 is straddled by the side skirt members 64. In a manner which will be described more fully below, the side skirt members 64 are spaced to slidably receive therebetween the smaller disconnectible memory storage card 22. To this end, each of the side skirt members 64 extends to a cam edge 66 contoured to engageably receive the second larger disconnectible memory storage card 24. The movable cover is moved to the second phantom position of FIG. 3 when the second larger disconnectible memory storage card 24 achieves the seated position.

Figure 2:
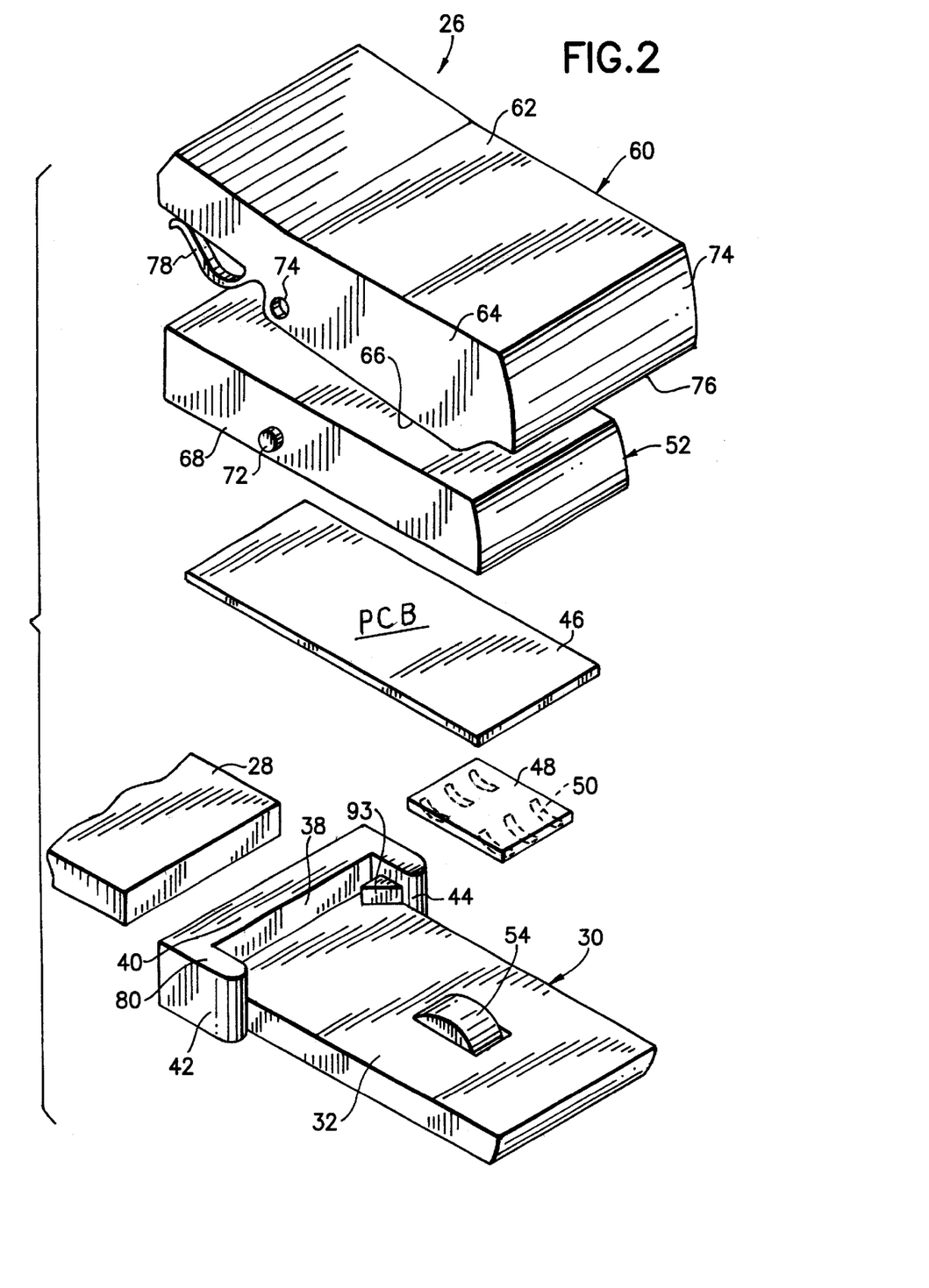
FIG. 2 is an exploded perspective view of the reader housing assembly illustrated in FIG. 1.

The fixed cover 52 includes a pair of downwardly extending flange members 68 parallel to and proximately spaced from the side skirt members 64 of the movable cover 60. Spaced apart pivot joints 70 between each of the side skirt members 64 of the movable cover 60 and the flange members 68 enable movement of the movable cover between the first and second positions earlier described. Each pivot joint is composed of a stub shaft 72 fixed to and projecting laterally away from its associated flange member and a mating bore 74 in each side skirt member 64 which freely receives an associated stub shaft. Other hinge assemblies could also be used.

The movable cover 60 further includes a front skirt member 74 integrally joining and extending between the side skirt members 64 and extending to a free bottom edge 76 which is sufficiently spaced from the card receiving surface 32 of the bottom tray member 30 when the movable cover is in the first or lowered or solid line position of FIG. 3 to permit insertion of a disconnectible memory storage card 22, 24 through the entry slot 34. Skirt 74 does, however, sufficiently protect entry slot 34 (and the inner components of system 20) from dust and debris.

An elliptic spring 78 is integral with and projects from each of the side skirt members 64 engaged with an associated one of a pair of ledges 80 on the shoulder members 42, 44. The springs 78 thereby operate mutually to bias the movable cover 60 toward the first position as earlier defined.

As earlier mentioned, the card reading system 20 accommodates both a first smaller rectangular disconnectible memory storage card 22 and a second larger rectangular disconnectible memory storage card 24. When the smaller card 22 is inserted into the connection chamber 36 through the entry slot 34 and advanced to a seated position, a first minor edge 82 is in contiguous engagement with the stop surface 38 and with major edges 84, 86 adjacent the first minor edge being contiguous, respectively, with the locating indicia in the form of the tab members 42, 44. It will also be appreciated that the width of the card 22, that is, the distance between the edges 84, 86 is less than the distance between the side skirt members 64 at the entry slot 34. In this manner, the movable cover 60 remains in the solid line position (FIG. 3) when the card 22 is introduced into the reader housing assembly 26. In any event, when the card 22 is in the fully seated position, the contact pads 56 are mechanically and electrically engaged with the resilient contacts 50 on the connector 48.

As previously mentioned, the reader housing assembly 26 also accommodates the larger rectangular disconnectible memory storage card 24 which is defined by opposed minor edges 88 and opposed major edges 90. A pair of spaced apart locating indicia 92 are provided in a foremost minor edge 88. The locating indicia 92 are sized and positioned for mating engagement with the spaced apart locating indicia in the form of the tab members 42, 44 of the reader housing assembly 26 when inserted into the connection chamber 36 through the entry slot 34 and advanced to a seated position at which the foremost minor edge 88 is in contiguous engagement with the stop surface 38. Unlike the instance of the card 22, when the card 24 is inserted through the entry slot 38, being of a width greater than that of the movable cover 60, the foremost minor edge 88 engages the cam edges of the side skirt members, raising the front skirt member 74 and pivoting the entire movable cover 60 against the bias of the elliptic springs 78. In the same manner as the card 22, when the card 24 is in the fully seated position, the contact pads 58 are mechanically and electrically engaged with the resilient contacts 50 on the connector 48.

The invention may also employ a further expedient as a failsafe measure to assure that the cards 22, 24 will be properly positioned, and not upside down, when introduced through the entry slot 34. To this end, the reader housing assembly 26 may include mutually cooperating indicia on the reader housing assembly and on each of the disconnectible memory storage cards permitting only one orientation of a disconnectible memory storage card when advanced to the seated position in the connection chamber. More specifically, a corner projection 93 is provided at the intersection between the stop surface 38 and the tab member 44 intended to contiguously interface with similarly fashioned beveled edges 94, 96 on the cards 22, 24, respectively, when the cards are fully seated in the reader housing assembly 26.

Figure 8:
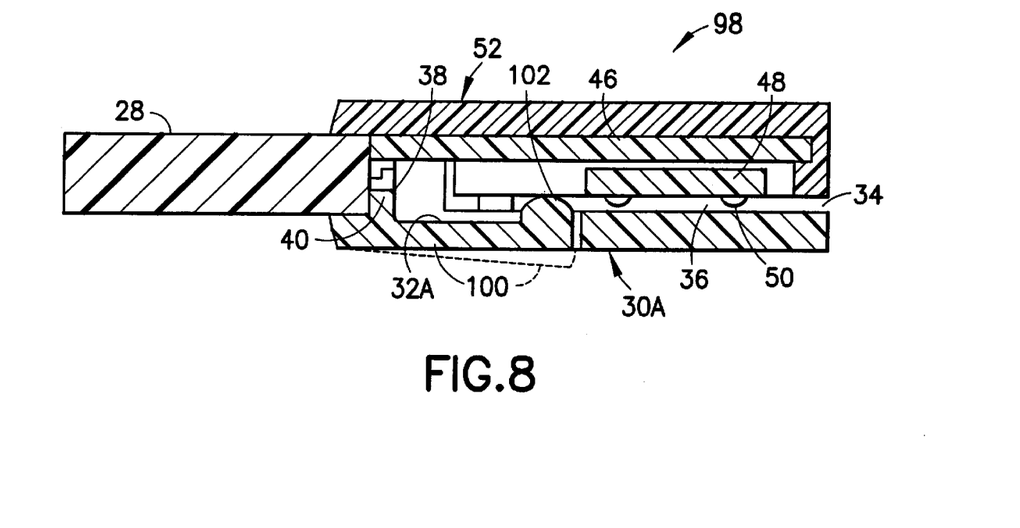
FIG. 8 is a cross section view, in side elevation, similar to FIG. 5 illustrating another embodiment of the reader housing assembly.
Figure 9:
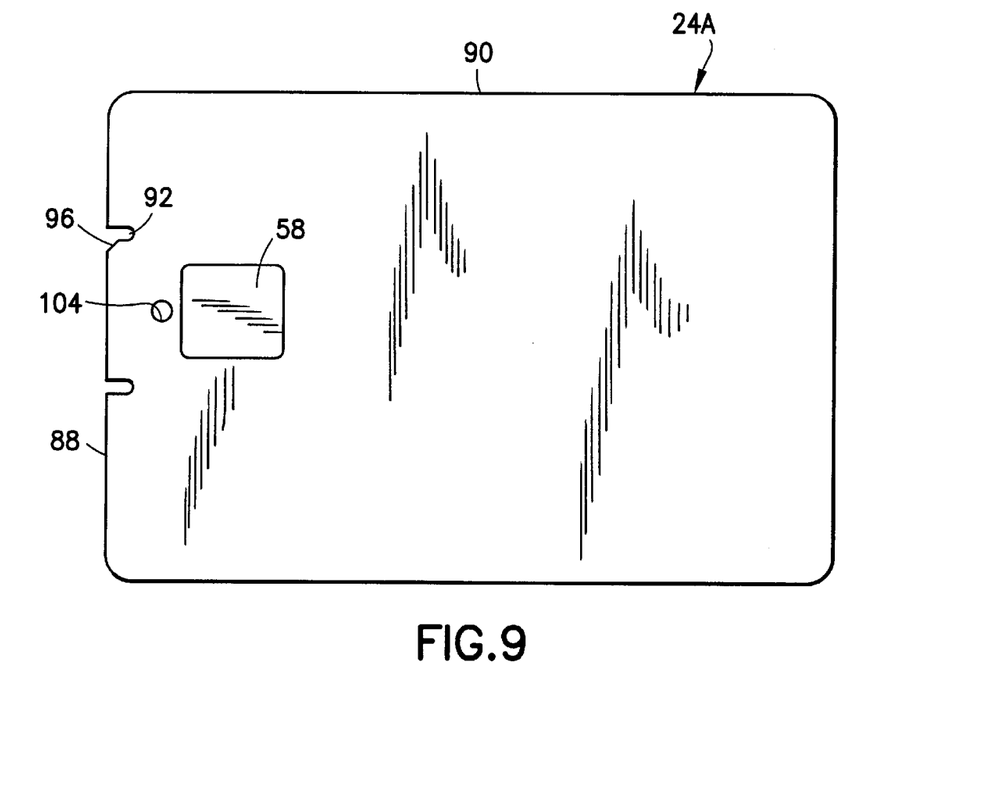
FIG. 9 is a top plan view, similar to FIG. 7, illustrating a modified disconnectible memory storage card for use with the modified reader housing assembly of FIG. 8.

Turn now to FIGS. 8 and 9 for the description of another embodiment of the invention. In this instance, a modified reader housing assembly 98 is similar to the reader housing assembly 26 previously described but lacks the movable cover 60. For ease of understanding, unchanged components will bear the same reference numerals as before and only new or modified components will bear new reference numerals. The modified reader housing assembly 98 includes a bottom tray member 30A having a disconnectible memory storage card receiving surface 32A extending between the entry slot 34 and the stop surface 38 on a shoulder member 40. A resilient finger member 100 has a domed prominence 102 at a cantilevered free end of the finger member and projects toward the connector 48 in the connector chamber 36. The finger member 100 is biased toward a normally closed position indicated by solid lines in FIG. 8, but is movable to an open position indicated by dashed lines when the domed prominence 102, acting as a cam, is engaged by a first minor edge 88 of an electronic, or memory storage, card 24A (FIG. 9). The electronic card 24A is formed with a locking aperture 104 located between the first minor edge 88 and the contact pads 58. It will be appreciated that the electronic, or memory storage, card 22 may be similarly modified. In any event, as the electronic card 24A is inserted into the connection chamber 36 through the entry slot 34, the finger member is again movable to the closed position when the disconnectible electronic card reaches the seated position. In this position of the electronic card 98, the prominence 102 is received in the locking aperture 104 of the electronic card. The electronic card 24A and the reader housing assembly 98 are thereby locked together, but with moderate force applied to the electronic card by the user, it can easily be withdrawn from the reader housing assembly.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Card reading apparatus capable of accepting different sized disconnectible electronic cards comprising:

a reader housing assembly adapted to be electrically joined to an electrical connector including a stop surface extending between a pair of spaced apart locating features and enclosing a connection chamber including a connector therein with a plurality of resilient contacts projecting toward a course to be taken by a disconnectible memory storage card as it is inserted into the housing assembly, the housing assembly having an entry slot in communication with the connection chamber for reception therethrough of a disconnectible memory storage card being inserted into the connection chamber;

the reader housing assembly accommodating a first smaller rectangular disconnectible electronic card including a plurality of contact pads thereon for mechanical and electrical engagement, respectively, with the plurality of resilient contacts on the connector in the connection chamber and having opposed minor and major edges when inserted into the connection chamber through the entry slot and advanced to a seated position at which a first minor edge is in contiguous engagement with the stop surface and with the major edges adjacent the first minor edge being contiguous, respectively, with the locating features; and the reader housing assembly also accommodating a second larger rectangular disconnectible electronic card including a plurality of contact pads thereon positioned for mechanical and electrical engagement, respectively, with the plurality of resilient contacts on the connector in the connection chamber and having opposed minor and major edges and having a pair of spaced apart locating features in a first minor edge sized and positioned for mating engagement with the spaced apart locating features of the reader housing assembly when inserted into the connection chamber through the entry slot and advanced to a seated position at which the first minor edge is in contiguous engagement with the stop surface of the reader housing assembly.

2. Card reading apparatus as set forth in claim 1 wherein the reader housing assembly includes:

a bottom tray member having a disconnectible memory storage card receiving surface extending between the entry slot and the stop surface on a shoulder member, the spaced apart locating features being a pair of laterally spaced tab members on the shoulder member projecting, respectively, toward the entry slot; and a movable cover pivotally mounted on and overlying the bottom tray member movable between a first position for reception of the cards and a second position after reception of the second larger disconnectible electronic card, the movable cover being biased toward the first position.

3. Card reading apparatus as set forth in claim 2 including:
a spring biasing the movable cover toward the first position.

4. Card reading apparatus as set forth in claim 3 wherein the movable cover includes:
a top member; and
a pair of parallel, spaced apart, side skirt members depending from the top member, the card receiving surface being straddled by the side skirt members, the side skirt members being spaced to slidably receive therebetween the smaller disconnectible memory storage card, each of the side skirt members extending to a cam edge contoured to engageably receive the second larger disconnectible memory storage card, the movable cover being moved to the second position when the second larger disconnectible memory storage card achieves the seated position.

5. Card reading apparatus as set forth in claim 1 wherein the housing assembly includes a card receiving surface on a bottom tray member which includes a prominence for urging the contact pads of a disconnectible memory storage card into engagement with the resilient contacts of the connector in the connection chamber of the reader housing assembly when the disconnectible memory storage card is in the seated position.

6. Card reading apparatus as set forth in claim 1 wherein the reader housing assembly includes a printed circuit board overlying the card receiving surface and, together with the card receiving surface of the bottom tray, defining the connection chamber, the connector being mounted on the printed circuit board and projecting toward the card receiving surface.

7. Card reading apparatus as set forth in claim 6 wherein the reader housing assembly includes a fixed cover protectively overlying and contiguous with the printed circuit board and sandwiching the printed circuit board between the fixed cover and the bottom tray member.

8. Card reading apparatus as set forth in claim 7 wherein the fixed cover includes downwardly extending flange members parallel to and proximately spaced from the side skirt members of the movable cover;
wherein the movable cover includes:
a top member; and
a pair of parallel, spaced apart, side skirt members depending from the top member, the card receiving surface being straddled by the side skirt members, the side skirt members being spaced to slidably receive therebetween the smaller disconnectible memory storage card, each of the side skirt members extending to a cam edge contoured to engageably receive the second larger disconnectible memory storage card, the movable cover being moved to the second position when the second larger disconnectible memory storage card achieves the seated position; and
including:
spaced apart pivot joints between each of the side skirt members of the movable cover and the flange members enabling movement of the movable cover between the first and second positions;
spaced apart ledges on the shoulder members; and
an elliptic spring integral with and projecting from each of the side skirt members engaged with an associated one of the ledges on the shoulder member.

9. Card reading apparatus as set forth in claim 8 wherein the movable cover includes a front skirt member integrally joining and extending between the side skirt members and extending to a free bottom edge which is sufficiently spaced from the card receiving surface of the bottom tray member when the movable cover is in the first position to permit insertion of a disconnectible memory storage card through the entry slot.

10. Card reading apparatus capable of accepting different sized disconnectible electronic cards comprising:
a reader housing assembly enclosing a connection chamber including a connector therein with a plurality of resilient contacts projecting toward a course to be taken by a disconnectible memory storage card as it is inserted into the housing assembly, the housing assembly having an entry slot in communication with the connection chamber for reception therethrough of a disconnectible memory storage card being inserted into the connection chamber; and
first and second rectangular disconnectible electronic cards, each including a similarly sized and positioned plurality of contact pads thereon for mechanical and electrical engagement, respectively, with the plurality of resilient contacts on the connector in the connection chamber when inserted into the connection chamber through the entry slot and advanced to a seated position;
mutually engageable alignment mechanisms both on the reader housing assembly and on each of the disconnectible electronic cards to assure that each of the contact pads is in mechanical and electrical engagement, respectively, with the plurality of resilient contacts on the connector in the connection chamber when an associated disconnectible memory storage card is advanced to the seated position.

11. Card reading apparatus as set forth in claim 10 wherein the reader housing assembly includes:
a bottom tray member having a disconnectible electronic card receiving surface extending between the entry slot and the stop surface on a shoulder member, the spaced apart locating features being a pair of laterally spaced tab members on the shoulder member projecting, respectively, toward the entry slot; and
a movable cover pivotally mounted on and overlying the bottom tray member movable between a first position for reception of the cards and a second position after reception of the second larger disconnectible electronic card, the movable cover being biased toward the first position.

12. Card reading apparatus as set forth in claim 11 including:
a spring biasing the movable cover toward the first position.

13. Card reading apparatus as set forth in claim 12 wherein the movable cover includes:
a top member; and
a pair of parallel, spaced apart, side skirt members depending from the top member, the card receiving surface being straddled by the side skirt members, the side skirt members being spaced to slidably receive therebetween the smaller disconnectible electronic card, each of the side skirt members extending to a cam edge contoured to engageably receive the second larger disconnectible electronic card, the movable cover being moved to the second position when the second larger disconnectible electronic card achieves the seated position.

14. Card reading apparatus as set forth in claim 11 wherein a card receiving surface of a bottom tray member includes a prominence for urging the contact pads of a disconnectible electronic card into engagement with the resilient contacts of the connector in the connection chamber of the reader housing assembly when the disconnectible electronic card is in the seated position.

15. Card reading apparatus as set forth in claim 10 wherein the reader housing assembly includes a printed circuit board overlying the card receiving surface and, together with the card receiving surface of the bottom tray, defining the connection chamber, the connector being mounted on the printed circuit board and projecting toward the card receiving surface.

16. Card reading apparatus as set forth in claim 15 wherein the reader housing assembly includes a fixed cover protectively overlying and contiguous with the printed circuit board and sandwiching the printed circuit board between the fixed cover and the bottom tray member.

17. Card reading apparatus as set forth in claim 16 wherein the fixed cover includes downwardly extending flange members parallel to and proximately spaced from the side skirt members of the movable cover;

wherein the movable cover includes:

a top member; and a pair of parallel, spaced apart, side skirt members depending from the top member, the card receiving surface being straddled by the side skirt members, the side skirt members being spaced to slidably receive therebetween the smaller disconnectible electronic card, each of the side skirt members extending to a cam edge contoured to engageably receive the second larger disconnectible electronic card, the movable cover being moved to the second position when the second larger disconnectible electronic card achieves the seated position; and including:

spaced apart pivot joints between each of the side skirt members of the movable cover and the flange members enabling movement of the movable cover between the first and second positions;

spaced apart ledges on the shoulder members; and an elliptic spring integral with and projecting from each of the side skirt members engaged with an associated one of the ledges on the shoulder member.

18. Card reading apparatus as set forth in claim 17 wherein the movable cover includes a front skirt member integrally joining and extending between the side skirt members and extending to a free bottom edge which is sufficiently spaced from the card receiving surface of the bottom tray member when the movable cover is in the first position to permit insertion of a disconnectible electronic card through the entry slot.

19. Card reading apparatus as set forth in claim 1 wherein the reader housing assembly includes:

mutually cooperating features on the reader housing assembly and on each of the disconnectible electronic cards permitting only one orientation of a disconnectible electronic card when advanced to the seated position in the connection chamber.

20. Card reading apparatus as set forth in claim 1 wherein the reader housing assembly includes:

a bottom tray member having a disconnectible memory storage card receiving surface extending between the entry slot and the stop surface on a shoulder member, the spaced apart locating features being a pair of laterally spaced tab members on the shoulder member projecting, respectively, toward the entry slot; and a resilient finger member having a prominence at a cantilevered free end projecting toward the connector in the connector chamber, the finger member being biased toward a normally closed position but movable to an open position when the prominence is engaged by the first minor edge of an electronic card, having a locking aperture therein located between the first minor edge and the contact pads, as the electronic card is inserted into the connection chamber through the entry slot, the finger member subsequently being movable to the closed position when the disconnectible memory storage card is in the seated position, the prominence being received in the locking aperture of the electronic card.

* * * * *